United States Patent [19]

Hoshi

[11] Patent Number: 4,630,348

[45] Date of Patent: Dec. 23, 1986

[54] DOUBLE-PIPE COMBINING DEVICE

[75] Inventor: Katsumasa Hoshi, Hasuda, Japan

[73] Assignee: Showa Denko Kabushiki Kaisha, Tokyo, Japan

[21] Appl. No.: 767,633

[22] Filed: Aug. 20, 1985

Related U.S. Application Data

[62] Division of Ser. No. 419,624, Sep. 17, 1982, abandoned.

[30] Foreign Application Priority Data

Sep. 22, 1981 [JP] Japan .............................. 56-139820[U]
Sep. 22, 1981 [JP] Japan .............................. 56-139819[U]
Aug. 30, 1982 [JP] Japan .................................. 57-149223

[51] Int. Cl.⁴ .............................................. B23P 19/04
[52] U.S. Cl. ......................................... 29/234; 29/244
[58] Field of Search ................. 29/234, 237, 280, 282, 29/244; 269/233

[56] References Cited

U.S. PATENT DOCUMENTS 2,642,908  6/1953  Landgraf ......................... 269/233 X
3,987,532 10/1976  Shemtov ............................... 29/234
4,366,610  1/1983  Fabbri .................................... 29/234

Primary Examiner—Frederick R. Schmidt
Assistant Examiner—Steven P. Schad
Attorney, Agent, or Firm—Cushman, Darby & Cushman

[57] ABSTRACT

A double-pipe combining device comprising a revolver, at least one pipe combining means arranged on the outer surface of the revolver, and at least one cam mechanism, the pipe combining means comprising a first pipe receiving means, a second pipe receiving means, and a slidable pipe pusher, the cam mechanism being arranged to move the pipe pusher forward and backward within one rotation of the revolver, the double-pipe combining device being arranged to automatically combine the larger-diameter pipe and smaller-diameter pipe, through the reciprocating movement of the pipe pusher, only by placing those pipes respectively in the two pipe receiving means and rotating the revolver.

6 Claims, 8 Drawing Figures

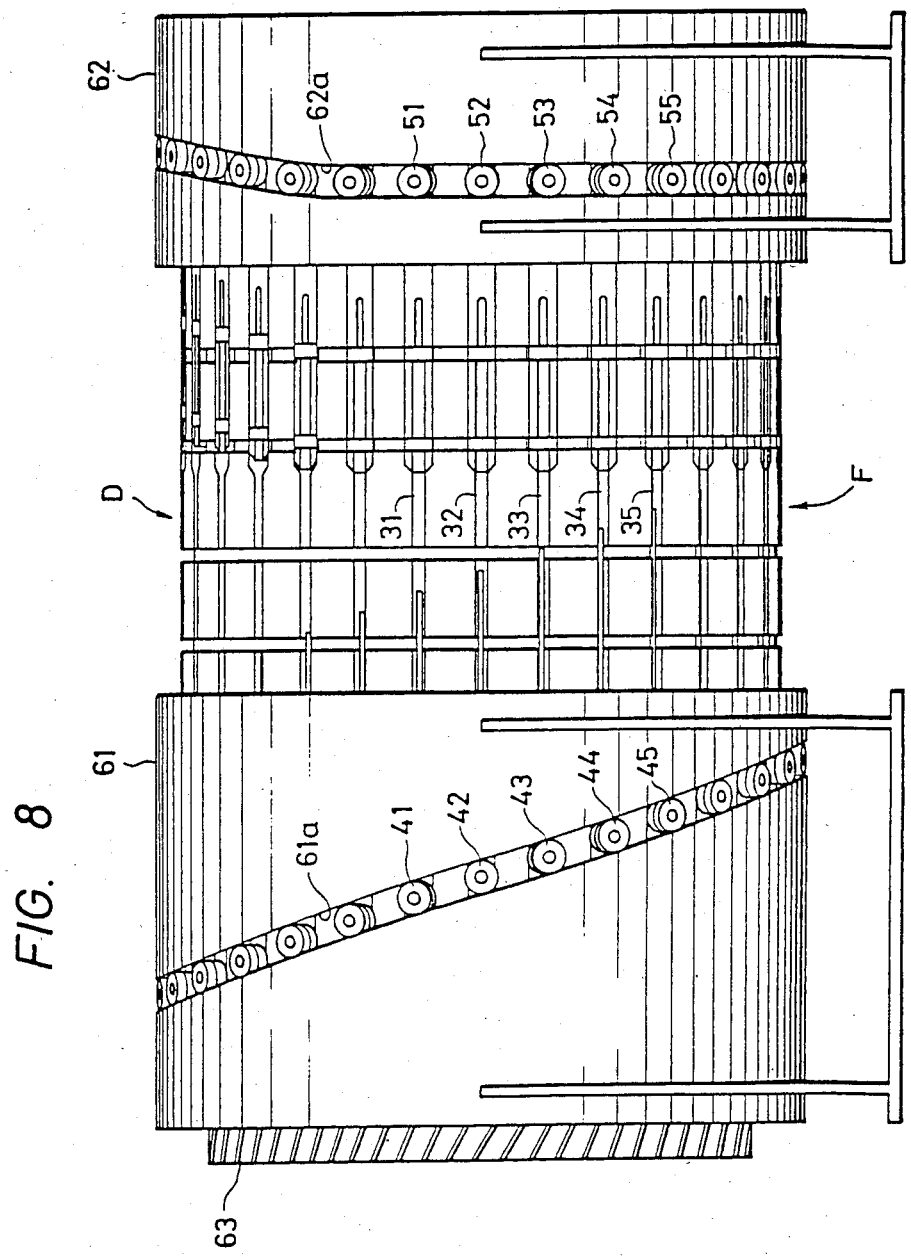

4,630,348

DOUBLE-PIPE COMBINING DEVICE

This is a division of application Ser. No. 419,624 filed Sept. 17, 1982, now abandoned.

BACKGROUND OF THE INVENTION (A) Field of the Invention

The present invention relates to a double pipe consisting of a pair of pipes having different diameters and combined with each other and to be used for sucking the drinking water or the like therethrough and to a double-pipe combining device for combining those pipes.

(B) Description of the Prior Art

Known pipes to be used for sucking the drinking water or the like are formed as a long and slender tubular body. Such sucking pipe should have a certain length convenient for sucking the drinking water or the like therethrough. That is, for drinking the drinking water using the sucking pipe, the sucking pipe should have a length at least larger than the height of a container containing the drinking water though the required length may differ with the height of the container containing the drinking water. On the other hand, it is preferable that the length of the sucking pipe is as short as possible in order to facilitate storage, carrying, transportation, attachment to the container containing the drinking water, and so forth. When the sucking pipe is long, it occupies a large space and, moreover, it will be sometimes bent because this kind of sucking pipe is made of paper, synthetic resin, etc.

SUMMARY OF THE INVENTION

It is, therefore, a primary object of the present invention to provide a double pipe formed by combining a pair of pipes with different diameters, i.e., a larger-diameter pipe and a smaller-diameter pipe, and having at least one projected portion provided on the inner surface of the larger-diameter pipe and/or on the outer surface of the smaller-diameter pipe, said double pipe being arranged to be kept in the short state at the time of storage, carrying, etc. and to be extended to the long state when using it for sucking the drink, said bouble pipe being further arranged by means of said projected portion so that one of the pair of pipes will not come off the other.

Another object of the present invention is to provide a double-pipe combining device comprising a substantially cylindrical body (hereinafter referred to as a revolver), which may be hollow or solid and has a rotary shaft connected to or formed integral with the revolver, and at least one pipe combining means provided on the outer surface of said revolver, said double-pipe combining device being arranged to automatically combine the larger-diameter pipe and smaller-diameter pipe only by placing the larger-diameter pipe and smaller-diameter pipe respectively in pre-determined positions in said pipe combining means and by rotating said revolver.

BRIEF DESCRIPTION OF THE DRAWINGS

FIG. 8 shows a front view of the double-pipe combining device according to the present invention having a plural number of pipe combining means.

DETAILED DESCRIPTION OF THE PREFERRED EMBODIMENTS

Figure 1:
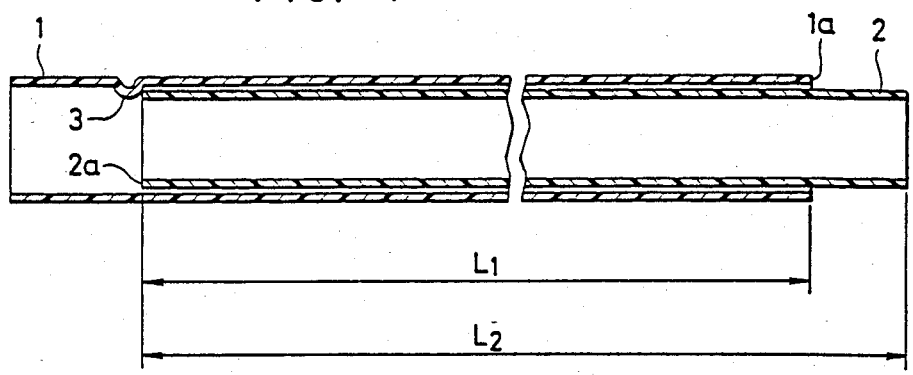
FIG. 1 shows a sectional view of Embodiment 1 of the double pipe according to the present invention.

In FIG. 1 showing an enlarged sectional view of Embodiment 1 of the double pipe according to the present invention, numeral 1 designates a larger-diameter pipe, and numeral 2 designates a smaller-diameter pipe having an outer diameter slightly smaller than the inner diameter of the larger-diameter pipe 1, the smaller-diameter pipe 2 being inserted in the hollow internal portion of the larger-diameter pipe 1 as illustrated in the figure so that those pipes form a double pipe being combined in the state that they can be moved mutually. Out of those pipes, the larger-diameter pipe 1 has a projected portion 3 formed on the inner surface thereof and projecting toward the inside thereof. Therefore, when the smaller-diameter pipe 2 is inserted to the larger-diameter pipe 1, the movement of the smaller-diameter pipe 2 is stopped as the end portion 2a of the smaller-diameter pipe 2 comes into contact with the projected portion 3 formed in the larger-diameter pipe 1 and, therefore, it is impossible to further insert the smaller-diameter pipe 2. Besides, when the length $L_2$ of the smaller-diameter pipe 2 is made longer than the length $L_1$ of the portion of the larger-diameter pipe 1 from its projected portion 3 to its end portion 1a on the smaller-diameter pipe inserting side, a part of the smaller-diameter pipe 2 is always exposed to the outside of the larger-diameter pipe 1.

For the double pipe for sucking of drink constructed as described in the above, its overall length is kept short by pushing the smaller-diameter pipe 2 into the larger-diameter pipe 1 as shown in the figure at the time of storage, carrying, etc. When using the pipe, the smaller-diameter pipe 2 is pulled out by holding its slightly exposed portion by fingers until the overall length of the double pipe becomes suitable for the height of the container of drink. Besides, when the fingers are released from the pipe after the use, the smaller-diameter pipe 2 goes down because of its dead weight but it is stopped when the end portion 2a of the smaller-diameter pipe 2 comes-into contact-with the projected portion 3 and, therefore, the double pipe returns to the original state shown in the figure.

Though the double pipe shown in FIG. 1 has only one projected portion 3, it is also possible to provide a plural number of projected portions or to provide an annular projected portion or projected portion of any other shape.

Figure 2:
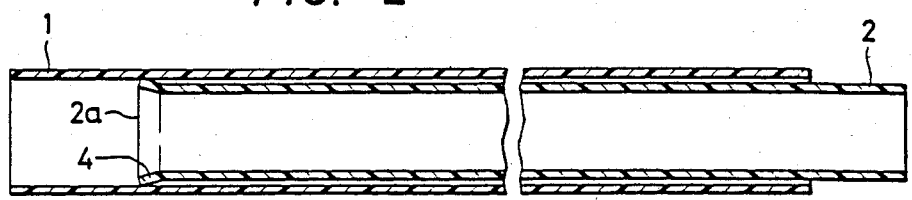
FIG. 2 shows a sectional view of Embodiment 2 of the double pipe according to the present invention.

FIG. 2 shows Embodiment 2 of the double pipe according to the present invention. This embodiment is also constructed by inserting a smaller-diameter pipe 2 into the hollow internal portion of a larger-diameter pipe 1 like Embodiment 1. However, in case of Embodiment 2, the larger-diameter pipe 1 is not provided with a projected portion. On the other hand, the smaller-diameter pipe 2 has an expanded portion 4 at its end portion 2a which comes to the inside of the larger-diameter pipe 1, said expanded portion 4 being formed by expanding the end portion 2a into a bell-mouthed shape. When the smaller-diameter pipe 2 is inserted to the larger-diameter pipe 1, the expanded portion 4 is gently pushed against the inner surface of the larger-diameter pipe 1 and, therefore, the smaller-diameter pipe 2 does not go down by its dead weight even when the double pipe is put in an upright position.

Embodiment 2 enables to vary the overall length of the double pipe only by relatively moving the larger-diameter pipe 1 and smaller-diameter pipe 2 and, at the same time, to stop the smaller-diameter pipe 2 in any desired position as the expanded portion 4 of the smaller-diameter pipe 2 is pushed against the inner surface of the larger-diameter pipe 1. Therefore, at the time of storage, carrying, etc., it is possible to make the overall length of the double pipe short by pushing the smaller-diameter pipe 2 into the larger-diameter pipe 1. When using the double pipe, it is possible to increase its overall length to an adequate value and, moreover, to use the double pipe by keeping it in the state of that adequate length.

The shape of the end portion 2a of the smaller-diameter pipe 2 is not limited to the shape shown in FIG. 2. It is also possible to provide an annular projected portion of suitable shape or to provide one or more projected portion or portions having the shape similar to the projected portion 3 shown in FIG. 1 or having any other shape as far as such projected portion has a shape and size suitable for being gently pushed against the inner surface of the larger-diameter pipe 1. Besides, the position for providing such portion or portions is not limited to the end portion 2a. However, it is preferable to provide the projected portion or portions at the end portion 2a because it is then possible to make the overall length of the double pipe longer when it is extended by pulling out the smaller-diameter pipe 2.

Figure 3:
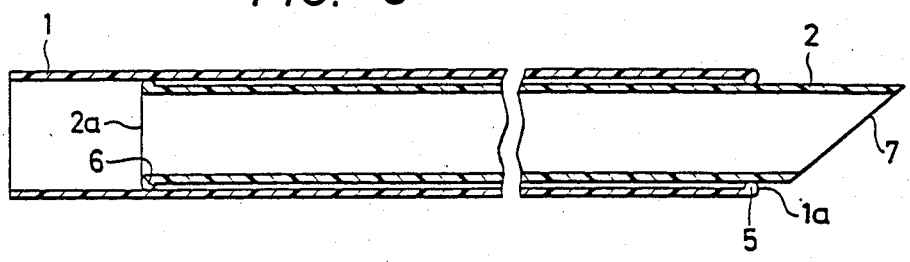
FIG. 3 shows a sectional view of Embodiment 3 of the double pipe according to the present invention.

FIG. 3 shows Embodiment 3 of the double pipe according to the present invention. In this embodiment, a projected portion 5 is formed on the inner surface of the larger-diameter pipe 1 at its end portion 1a and a projected portion 6 is formed on the outer surface of the smaller-diameter pipe 2 at its end portion 2a.

In Embodiment 3, the projected portion 5 of the larger-diameter pipe 1 is gently pushed against the outer surface of the smaller-diameter pipe 2 and the projected portion 6 of the smaller-diameter pipe 2 is gently pushed against the inner surface of the larger-diameter pipe 1. Therefore, when those pipes are relatively moved, for example, by pulling the smaller-diameter pipe 2 by holding its outer end by fingers, it is possible to vary the overall length of the double pipe. Besides, when the above-mentioned pulling motion is stopped, it is possible to keep the double pipe in the state of the length obtained at that time. Moreover, when the double pipe is fully extended, the projected portion 5 and projected portion 6 engages with each other and, consequently, the two pipes cannot be relatively moved any more. Therefore, the two pipes will not be separated from each other by mistake.

In case of Embodiment 3 shown in FIG. 3, the outer end portion 7 of the smaller-diameter pipe 2 is arranged to have a pointed shape. The purpose of this arrangement is to enable to easily insert the pipe to the pipe inserting hole formed in a paper package when drinking the drink contained in a paper package and to obtain the double pipe more conveniently by the double-pipe combining device according to the present invention to be described later. Therefore, it is also all right to arrange that the outer end portion of the smaller-diameter pipe 2 has a circular section. Besides, for Embodiment 1 and 2 described before, it is also possible to arranged so that one of the two pipes constituting the double pipe has a pointed end.

Generally, the materials of these pipes are synthetic resins(for example, polypropylene, high-density polyethylene). However, these pipes may be made of any material such as metallic foil, paper, etc. as far as the material is light in weight and has favourable water-resisting and corrosion-resisting properties.

When the material is a synthetic resin, the pipes are produced by extruding the material into a hollow tubular shape by the extrusion molding method and cutting to a pre-determined length.

To provide the projected portion to each pipe, the molded pipe may be pushed or knocked by an end of a bar. In that case, the projected portion may be formed by interlocked operation of the bar and a cutter for cutting the pipe to the pre-determined length when the pipe is formed by extrusion molding.

Another method for forming the projected portion is to melt and deform the synthetic resin by heating a part of the pipe. For example, the pipes cut to the pre-determined length may be placed at pre-determined intervals on a conveyor, which moves at a pre-determined speed, so that the pipes are arranged in the direction at a right angle to the moving direction of the conveyor. On the other hand, a heating plate may be arranged on one side of the conveyor. When the pipes are being conveyed by the conveyor arranged as above, one end of each pipe is heated by the heating plate when the pipe passes the position near the heating plate. Thus, that end portion of the pipe is melted and deformed and, consequently, the thickness of the end portion becomes large. In other words, a projected portion is formed. Besides, a projected portion may be formed by inserting a heated member, which has a shape like a tapered bar for example, into the hollow end portion of the pipe and thereby expanding the end portion.

When the larger-diameter pipe and smaller-diameter pipe, which are respectively cut to the pre-determined length or lengths and either or both of which have a projected portion or portions formed as described in the above, are combined with each other, it is possible to obtain the double pipe according to the present invention which is illustrated by respective embodiments shown in FIGS. 1, 2 and 3. However, as the outer diameter of the smaller-diameter pipe and inner diameter of the larger-diameter pipe are approximately the same, it is not so easy to combine them and, therefore, it takes time to combine them.

When the double-pipe combining device according to the present invention described below is used, it is possible to combine the larger-diameter pipe and smaller-diameter pipe quite easily with high efficiency.

Figure 4:
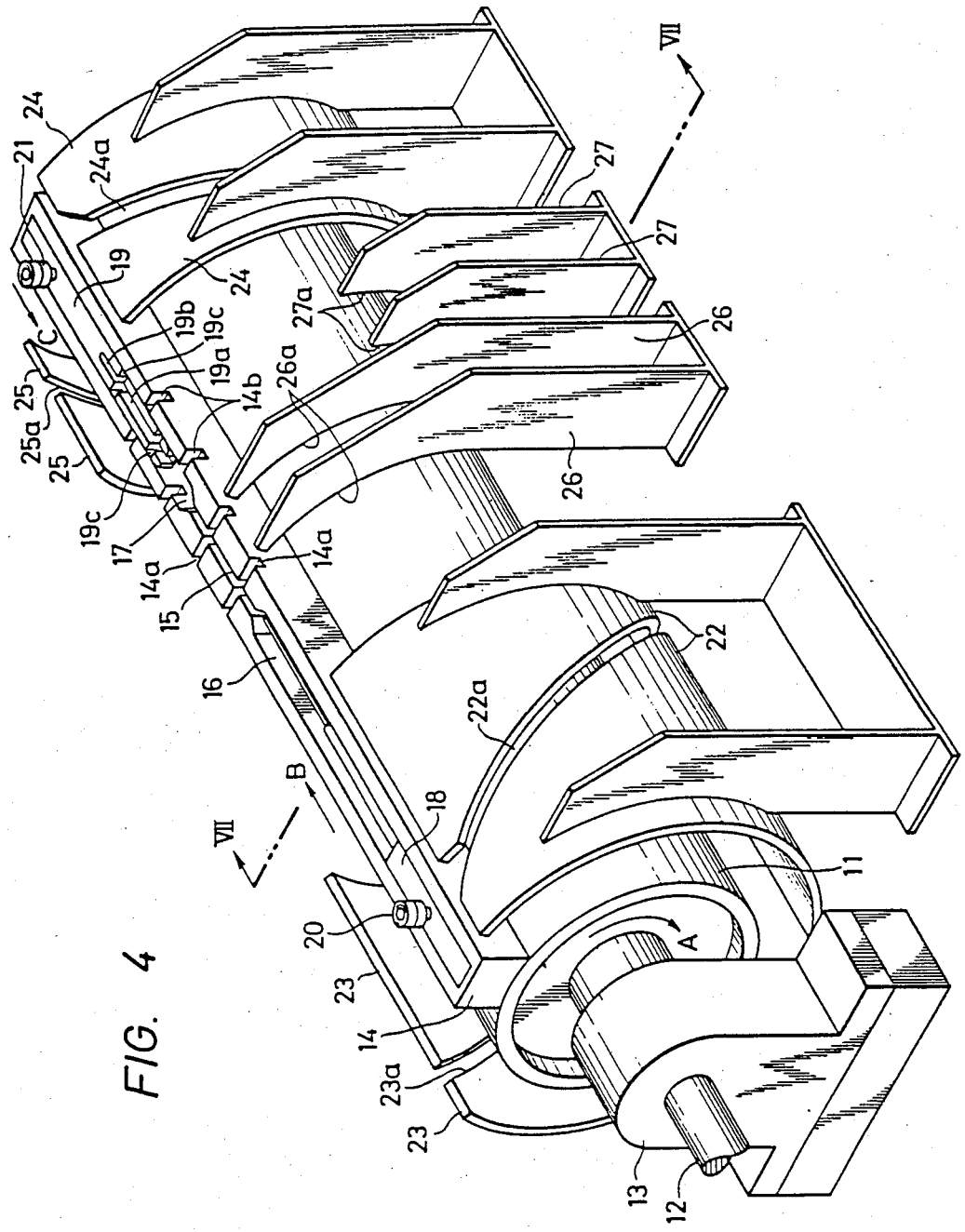
FIG. 4 shows a perspective view of the double-pipe combining device according to the present invention.
Figure 5:
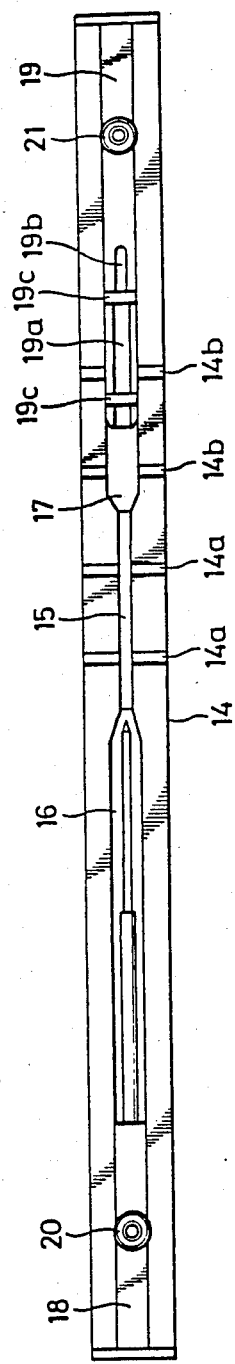
FIG. 5 shows an enlarged plan view of the pipe combining means constituting said double-pipe combining device.
Figure 6:
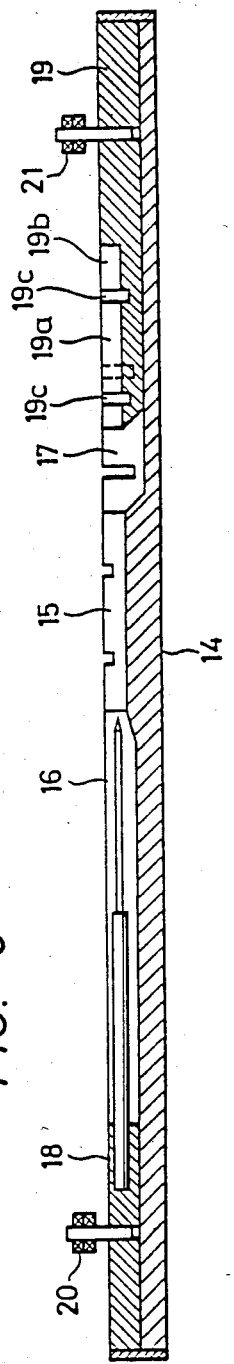
FIG. 6 shows a longitudinal sectional view of said pipe combining means.
Figure 7:
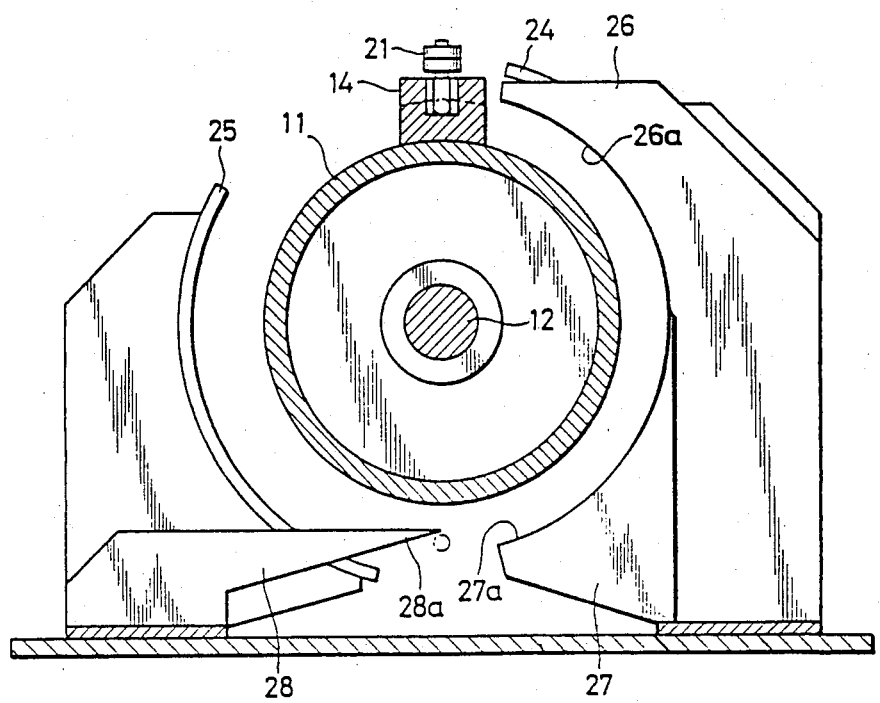
FIG. 7 shows a sectional view taken along the line VII—VII in FIG. 4.

In FIG. 4 showing a perspective view of an example of the double-pipe combining device according to the present invention, numeral 11 designates a revolver, which is rotatable round a rotary shaft 12 supported by bearings 13, and numeral 14 designates a pipe combining means. The pipe combining means 14 is arranged as shown in FIG. 5 (plan view) and FIG. 6( longitudinal sections view). That is, two pairs of grooves 14a and further two pairs of grooves 14b are formed in the direction at a right angle to the longitudinal direction of the pipe combining means 14 as shown in FIG. 5. Besides, a first pipe receiving means 15, which is long and has a width slightly larger than the outer diameter of one of the two pipes to be used for forming the double pipe according to the present invention, for example the smaller-diameter pipe, is formed in a position near the middle of the pipe combining means 14 and serves to receive said pipe. Furthermore, at the front and rear of the first pipe receiving means 15, sliding grooves 16 and 17 each having a width larger than the first pipe receiving means 15 are formed in the state that they are aligned with the extended center line of the first pipe receiving means 15. Numeral 18 designates a pipe pusher for pushing said one of the two pipes which is arranged to be slidable along the sliding groove 16. Numeral 19 designates a second pipe receiving means arranged to be slidable along the sliding groove 17 and having a second pipe receiving groove 19a, a groove 19b and two pairs of grooves 19c. The second pipe receiving groove 19a has a width larger than the outer diameter of the other pipe out of said two pipes to be used for forming the double pipe, for example the larger-diameter pipe. The groove 19b has a width larger than the outer diameter of one of said two pipes, for example the smaller-diameter pipe, but smaller than the outer diameter of the other pipe out of said two pipe, for example the larger-diameter pipe. Said two pairs of grooves 19c are formed in the direction at a right angle to the direction of said grooves 19a and 19b. Numerals 20 and 21 respectively designate cam followers which are respectively fixed to the pipe pusher 18 and second pipe receiving means 19. Numerals 22 and 23 respectively designate front cam plates arranged to embrace the front portion (portion on the left in FIG. 4) of the revolver 11 and respectively having cam rails 22a and 23a. Numerals 24 and 25 respectively designate rear cam plates arranged to embrace the rear portion (portion on the right in FIG. 4) of the revolver 11 and respectively having cam rails 24a and 25a. Numeral 26 designate front pipe holding bars each of which has a curved pipe holding portion 26a at the upper portion thereof as shown in FIG. 7. Numeral 27 designates rear pipe holding bars each of which has a curved pipe holding portion 27a at the inner part thereof as shown in FIG. 7. Numeral 28 designates pipe ejecting levers which are respectively arranged in the positions opposite to the rear pipe holding bars 27.

Now, the operation of the double-pipe combining device constructed as described in the above is explained below. At first, one of the two pipes for forming the double pipe according to the present invention, for example the smaller-diameter pipe 2 shown in FIG. 1, 2 or 3, is placed in the first pipe receiving means 15. Besides, the other pipe for forming the double pipe, for example the larger-diameter pipe 1, is placed in the second pipe receiving means 19. Then, the revolver 11 is turned in the direction shown by an arrow mark A (FIG. 4) by using a handle mounted to the rotary shaft 12. Thus, the pipe combining means 14 moves along the circumference round the rotary shaft 12. By this movement of the pipe combining means 14, the front and rear cam followers 20 and 21 are respectively engaged with the cam rail 22a of the front cam plate 22 and cam rail 24a of the rear cam plate 24 and move along these cam rails. Therefore, the pipe pusher 18 moves along the sliding groove 16 in the direction shown by an arrow mark B (FIG. 4) by pushing the smaller-diameter pipe, and the second pipe receiving means 19 moves along the sliding groove 17 in the direction shown by an arrow mark C (FIG. 4) together with the larger-diameter pipe. As the smaller-diameter pipe and larger-diameter pipe are located so that the positions and heights of their center lines coincide with each other, one end portion of the smaller-diameter pipe is inserted to the inside of the larger-diameter pipe by the above-mentioned movements. The second pipe receiving means 19 advances to and stops in the position where the two pairs of grooves 19c formed therein respectively coincide with the two pairs of grooves 14b formed in the pipe combining means 14. On the other hand, the pipe pusher 18 moves further by pushing the smaller-diameter pipe until the other end portion of the smaller-diameter pipe, i.e., the end portion on the pipe pusher side, is completely inserted to the inside of the larger-diameter pipe. At that time, the afore-mentioned one end of the smaller-diameter pipe will project from the larger-diameter pipe. However, as the groove 19b is formed in the second pipe receiving means 19, the pipe inserting movement is not disturbed. Besides, the end portion of the larger-diameter pipe is stopped by the side surfaces of the rear pair of grooves 19c (on the right in FIG. 5), out of the two pairs of grooves 19c, and therefore the larger-diameter pipe does not enter the groove 19b which has a diameter smaller than that of the second pipe receiving groove 19a. Shapes of the cam rails 22a and 24a of the cam plates 22 and 24 are decided so that the above-mentioned movements are completed before the pipe combining means 14 comes to the position at the bottom of the revolver 11.

During the above-mentioned operation, the pipe combining means 14 faces sideways and then downward as the revolver 11 rotates. However, the pipes do not come out of the pipe receiving means or fall down because they are held by the front pipe holding bars 26 and rear pipe holding bars 27. That is, when the revolver 11 rotates and the pipe combining means 14 moves, each pipe holding portion 26a, which is a circular-arc shaped edge portion formed at the inner portion of each of the front pipe holding bars 26, enters the corresponding one of the grooves 14a formed in the pipe combining means 14. At that time, the pipe holding portions 26a come to a position slightly higher than the smaller-diameter pipe as it is evident from FIG. 7 and, therefore, the smaller-diameter pipe is prevented from coming out of the pipe receiving means. Besides, the smaller-diameter pipe begins to enter the larger-diameter pipe soon after the beginning of the movement of the pipe combining means 14 and, therefore, the larger-diameter pipe also does not come out of the pipe receiving means.

When the revolver 11 further rotates and the pipe combining means 14 reaches the position of the rear pipe holding bars 27, each pipe holding portion 27a, which is a circular-arc shaped edge portion formed at the inner portion of each of the rear pipe holding bars 27, enters the corresponding one of the grooves 14b formed in the pipe combining means 14. Up to the above-mentioned moment, the second pipe receiving means 19 advances in the direction shown by the arrow mark C and comes to its stop position where its grooves 19c respectively coincide with the grooves 14b. Therefore, the pipe holding portions 27a of the rear pipe holding bars 27 enter the grooves 14b and 19c. At that time, the pipe holding portions 27a come to a position slightly lower than the larger-diameter pipe as it is evident from FIG. 7 and, therefore, the larger-diameter pipe is prevented from coming out of the pipe receiving means. Besides, a considerable portion of the smaller-diameter pipe is already inserted to the larger-diameter pipe and, therefore, the smaller-diameter pipe also does not come out of the pipe receiving means.

When combination of both pipes is completed without causing coming off of the pipes from the pipe combining means as described in the above, the pipe combining means 14 comes to the position at the bottom of the revolver 11 and, as it is evident from FIG. 7, the pipe holding portions 27a of the rear pipe holding bars 27 get out of the grooves 14b (the pipe holding portions 26a of the front pipe holding bars 26 get out of the grooves 14a before the above). Therefore, the double pipe combined as above falls down by its dead weight. At that time, end portion of the pipe pusher 18 might slightly remain in the smaller-diameter pipe in some cases and the combined double pipe might not fall down by its dead weight. In such case, the end portions 28a of the pipe ejecting levers shown in FIG. 7 serve to eject the double pipe so that it falls down.

As described so far, the smaller-diameter pipe and larger-diameter pipe are combined within the time when the revolver 11 completes half a rotation and the pipe combining means 14 moves from the top position to the bottom position of the revolver 11, and the combined double pipe falls down to the outside of the double-pipe combining device.

When the revolver 11 is further rotated, the cam follower 20 engages with the cam rail 23a of the front cam plate 23, which is arranged on the side opposite to the front cam plate 22, and moves in the direction opposite to the arrow mark B. As a result, the pipe pusher 18 also moves in the direction opposite to the arrow mark B. At the same time as above, the cam follower 21 engages with the cam rail 25a of the rear cam plate 25, which is arranged on the side opposite to the rear cam plate 24, and moves in the direction opposite to the arrow mark C. As a result, the second pipe receiving means 19 also moves in the direction opposite to the arrow mark C. Therefore, when the revolver 11 completes another half rotation and the pipe combining means 14 returns to the top position, the pipe pusher 18 and the second pipe receiving means 19 also return to their original positions.

As explained in the above, when the smaller-diameter pipe and larger-diameter pipe are respectively placed in pre-determined positions in the double-pipe combining device and the revolver is rotated for one rotation, the smaller-diameter pipe and larger-diameter pipe are automatically combined together and fall down to the outside of the device and, at the same time, respective members constituting the device return to their original positions.

In the example of the device described so far, the revolver 11 is rotated by the handle fixed to the rotary shaft 12. However, it is also possible to rotate the revolver by rotating the rotary shaft 12 by means of a suitable driving device.

In the above-mentioned example of the device, one combined double pipe is formed within one rotation of the revolver 11. However, when the device is arranged so that a plural number of combined double pipes are obtained within one rotation of the revolver, the device becomes suitable for mass production.

FIG. 8 shows another example of the double-pipe combining device according to the present invention which is arranged to obtain a plural number of combined double pipes in one rotation of the revolver. In FIG. 8, numerals 31, 32, . . . respectively designate pipe combining means which are arranged on the outer surface of the revolver. Each of those pipe combining means has substantially the same construction as the pipe combining means shown in FIGS. 5 and 6 and comprises a pipe pusher, a first and second pipe receiving means and so forth though they are not shown in FIG. 8. Numerals 41, 42, . . . respectively designate cam followers fixed respectively to the pipe pushers of the pipe combining means 31, 32, . . . , numerals 51, 52, . . . respectively designate cam followers respectively fixed to the second pipe receiving means of the pipe combining means 31, 32, . . . , numeral 61 designates a front cam plate having a cam rail 61a, numeral 62 designates a rear cam plate having a cam rail 62a, and numeral 63 designates a gear fixed to the rotary shaft of the revolver and is connected, for example, to a rotary shaft of a drive motor through another gear.

To operate the double-pipe combining device constructed as described in the above, the revolver is rotated by a drive motor through the gear 63 and, at the same time, smaller-diameter pipes and larger-diameter pipes are placed into the first pipe receiving means and second pipe receiving means of respective pipe combining means in turn in the position shown by an arrow mark D. When the revolver rotates, respective cam followers 41, 42, . . . and 51, 52, . . . move along the cam rail 61a of the cam plate 61 and cam rail 62a of the cam plate 62 and, therefore, the pipe pusher and the second pipe receiving means of each pipe combining means move toward the directions in which they approach each other by pushing the corresponding pipes in the same way as the device shown in FIG. 4. As a result, the pipes are combined in the same way as described before.

In the above-mentioned pipe combining operation, the pipe combining processes by respective pipe combining means 31, 32, . . . progress in turn during the time when those pipe combining means move from the position shown by the arrow mark D to the bottom position of the revolver and the combined double pipes fall down when the pipe combining means come to the position shown by the arrow mark F. Therefore, the pipe combining processes by respective pipe combining means are continuously carried out in turn. The pipe combining means, which has completed its pipe combining process, is returned to its original state during the time when it returns from the position F to the position D according to the rotation of the revolver. In the position D, that pipe combining means receives the pipes again and continues the pipe combining operation.

As described in the above, the double-pipe combining device shown in FIG. 8 is able to continuously combine the pipes causing almost no loss time. Therefore, it is very efficient and is suitable for mass production.

As explained so far, the double pipe according to the present invention enables to make its overall length short, at the time of storage, carrying, etc., by pushing the smaller-diameter pipe substantially into the larger-diameter pipe by moving one or both of those pipes and also to make its overall length long, at the time of use, by pulling the smaller-diameter pipe substantially out of the larger-diameter pipe by moving one or both of those pipes so that the overall length of the double pipe becomes the most convenient and suitable for the particular use. Therefore, the double pipe according to the present invention is convenient both for storage, carrying, etc. and for use. Moreover, in case of Embodiment 1 shown in FIG. 1, one of the pipes constituting the double pipe falls down by its dead weight and stops in the pre-determined position when the fingers are released from it after the use. In case of Embodiments 2 and 3 shown in FIG. 2 and 3, when the double pipe is extended to a suitable length by pulling one of the pipes constituting the double pipe by fingers, that pipe is kept stopped in that position even when the fingers are released from that pipe. Therefore, it is convenient for handling the double pipe when sucking the drink.

The double-pipe combining device according to the present invention illustrated by the example shown in FIGS. 4 through 7 and example shown in FIG. 8 enables to carry out the work for combining the two pipes, which constitute the double pipe according to the present invention illustrated by the above-mentioned respective embodiments, quite easily with high efficiency.

Especially, it is preferable to continuously perform the work for molding the two kinds of pipes for forming the double pipe, the work for providing the projected portion or portions to the molded pipes, and the work for combining those pipes using the double-pipe combining device according to the present invention.

I claim:

1. A double-pipe combining device comprising a revolver,
   a pipe combining means arranged on the outer surface of said revolver in the axial direction of said revolver and comprising a first pipe receiving means, and a second pipe receiving means respectively formed in the state that they are longitudinally aligned with each other, and a pipe pusher slidably arranged in said pipe combining means in the state that said pipe pusher is longitudinally aligned with said first and second pipe receiving means, and
   a cam mechanism for moving said pipe pusher forward and backward when said revolver is rotated to complete one rotation,
   said double-pipe combining device being arranged to combine a smaller-diameter pipe and a larger-diameter pipe by rotating said revolver after placing said smaller-diameter pipe and said larger-diameter pipe respectively in said first and second pipe receiving means, said cam mechanism serving to move said pipe pusher forward so that said pipe pusher pushes one of said two pipes in order to combine said two pipes and further serving to move said pipe pusher backward to the original position thereof.

2. A double-pipe combining device according to claim 1 wherein said second pipe receiving means is slidably arranged and said double-pipe combining device further comprises another cam mechanism for moving said second pipe receiving means forward and backward when said revolver is rotated to complete one rotation, said double-pipe combining device being arranged to combine said smaller-diameter pipe and said larger-diameter pipe by rotating said revolver after placing said smaller-diameter pipe and said larger-diameter pipe respectively in said first and second pipe receiving means, said two pipes being combined in such manner that a first one of said two pipes placed in said first pipe receiving means is moved by the forward movement of said pipe pusher while a second one of said two pipes placed in said second pipe receiving means is moved by the forward movement of said second pipe receiving means toward the direction wherein said second pipe approaches said first pipe when said revolver is rotated, said pipe pusher and said second pipe receiving means being respectively moved backward by said cam mechanisms toward directions wherein said pipe pusher and said second pipe receiving means move away from each other and are thereby returned to their original positions.

3. A double-pipe combining device according to claim 2 wherein a first one of said cam mechanisms for giving reciprocating movement to said pipe pusher comprises cam plates respectively having cam rails and a cam follower fixed to said pipe pusher, and a second one of said cam mechanisms for giving reciprocating movement to said second pipe receiving means comprises cam plates respectively having cam rails but different from said cam plates constituting said first cam mechanism and a cam follower fixed to said second pipe receiving means.

4. A double-pipe combining device according to claim 1 wherein said cam mechanisms for giving reciprocating movement to said pipe pusher comprises cam plates respectively having cam rails and a cam follower fixed to said pipe pusher.

5. A double-pipe combining device according to claim 1 further comprising at least one pipe holding bar, which is arranged in a position near said revolver and holds said pipes in such manner that said pipe holding bar is inserted into at least one groove provided on said pipe combining means when said revolver rotates, and a pipe ejecting lever for ejecting said pipes in such manner that said pipe ejecting lever is inserted into said groove when said pipe receiving means comes to the bottom side of said revolver.

6. A double-pipe combining device comprising a revolver,
   a plural number of pipe combining means each arranged on the outer surface of said revolver in the axial direction of said revolver and comprising a first pipe receiving means and a second pipe receiving means respectively formed in the state that they are longitudinally aligned with each other, and a pipe pusher slidably arranged in said pipe combining means in the state that said pipe pusher is longitudinally aligned with said first and second pipe receiving means,
   a first cam mechanism for giving reciprocating movement to said pipe pushers according to rotation of said revolver, and
   a second cam mechanism for giving reciprocating movement to said second pipe receiving means according to rotation of said revolver,
   said double-pipe combining device being arranged to combine a smaller-diameter pipe and a larger-diameter pipe in such manner that said revolver is kept rotated, said smaller-diameter pipe and said larger-diameter pipe are respectively placed in said first pipe receiving means and said second pipe receiving means of one of said plural number of pipe combining means when it comes in turn to a predetermined position substantially at the top of said revolver according to rotation of said revolver, said pipe pushers and said second pipe receiving means are moved by actions of said first and second cam mechanisms toward directions wherein said pushers and said second pipe receiving means mutually approach during the time when the corresponding pipe combining means move from the substantially top position to the substantially bottom position of said revolver so that said two pipes are thereby combined, and said pipe pushers and said second pipe receiving means respectively return to their original positions during the time when the corresponding pipe combining means move from said substantially bottom position to said substantially top position of said revolver.

* * * * *